United States Patent
Mamgain et al.

(10) Patent No.: US 11,243,758 B2
(45) Date of Patent: Feb. 8, 2022

(54) COGNITIVELY DETERMINING UPDATES FOR CONTAINER BASED SOLUTIONS

(71) Applicant: International Business Machines Corporation, Armonk, NY (US)

(72) Inventors: Paras Mamgain, New Delhi (IN); Venkata Kiran Kumar Darbha, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/789,782

(22) Filed: Feb. 13, 2020

(65) Prior Publication Data

US 2021/0255846 A1    Aug. 19, 2021

(51) Int. Cl.
*G06F 8/65*      (2018.01)
*H04L 29/08*    (2006.01)

(52) U.S. Cl.
CPC ............... *G06F 8/65* (2013.01); *H04L 67/34* (2013.01)

(58) Field of Classification Search
CPC ..... G06F 8/60; G06F 8/61; G06F 8/63; G06F 8/65; G06F 8/71
See application file for complete search history.

(56) References Cited

U.S. PATENT DOCUMENTS

| | | | | |
|---|---|---|---|---|
| 2004/0226019 A1* | 11/2004 | Tucker | ............... | G06F 21/6218 719/310 |
| 2012/0216285 A1* | 8/2012 | Walsh | .................... | G06F 21/53 726/26 |
| 2016/0350105 A1* | 12/2016 | Kumar | ..................... | G06F 8/20 |
| 2017/0093923 A1* | 3/2017 | Duan | ................... | G06F 11/2028 |
| 2018/0288129 A1* | 10/2018 | Joshi | ....................... | H04L 43/08 |
| 2019/0146772 A1* | 5/2019 | Griffin | .................... | G06F 9/455 717/121 |
| 2019/0205408 A1* | 7/2019 | Chen | .................. | G06F 11/0709 |
| 2020/0097662 A1* | 3/2020 | Hufsmith | ............... | H04L 67/10 |

(Continued)

FOREIGN PATENT DOCUMENTS

| | | |
|---|---|---|
| CN | 106227579 A | 12/2016 |
| CN | 106412126 A | 2/2017 |

(Continued)

OTHER PUBLICATIONS

Disclosed Anonymously, "Prompting User for Updated Docker Image While Pulling Docker Image", An IP.com Prior Art Database Technical Disclosure, IP.com No. IPCOM000259100D IP.com Electronic Publication Date: Jul. 12, 2019.

*Primary Examiner* — Duy Khuong T Nguyen
(74) *Attorney, Agent, or Firm* — Randy E. Tejeda (57) ABSTRACT

In an approach to cognitively determining and applying image updates to one or more containers, one or more computer processors detect an updated image for a container. The one or more computer processors, responsive to a pull request for the detected updated image, create a set of update information, wherein the set of update information includes one or more, bug fixes, features of the updated image, developer suggestions, and details of limitations introduced in the updated image. The one or more computer processors calculate a requirement value for the updated image. The one or more computer processors, responsive to exceeding a requirement threshold, update the container with the updated image.

18 Claims, 3 Drawing Sheets

(56) References Cited

U.S. PATENT DOCUMENTS

2020/0233691 A1* 7/2020 Rizvi .................. H04L 67/1095
2021/0056007 A1* 2/2021 Viswanathan ...... G06F 11/3624

FOREIGN PATENT DOCUMENTS

| CN | 106528224 A | 3/2017 |
| CN | 107294772 A | 10/2017 |
| CN | 107704252 A | 2/2018 |

* cited by examiner

COGNITIVELY DETERMINING UPDATES FOR CONTAINER BASED SOLUTIONS

BACKGROUND

The present invention relates generally to the field of operating system virtualization, and more particularly to containerization.

OS-level virtualization refers to an operating system paradigm in which a kernel allows an existence of multiple isolated user-space instances. Such instances, called containers, zones, virtual private servers, partitions, virtual environments, virtual kernel, or jails, may look like real computers from the perspective of the contained programs. A computer program running on an ordinary operating system can see all resources (connected devices, files and folders, network shares, CPU power, quantifiable hardware capabilities) of that computer, however, programs running inside of a container can only see the contents of the container and devices assigned to the container. Operating-system-level virtualization is commonly used in virtual hosting environments for securely allocating finite hardware resources among a large number of independent users. System administrators may also virtualize for consolidating server hardware by moving services on separate hosts into containers on a single host (e.g., server). Containers are commonly used for improved security, hardware independence, and added resource management features. Operating-system-level virtualization implementations capable of live migration can also be used for dynamic load balancing of containers between nodes in a cluster. Operating-system-level virtualization usually imposes less overhead than full virtualization because programs in virtual partitions use a normal system call interface of the operating system and do not need to be subjected to emulation or be run in an intermediate virtual machine, as is the case with full virtualization and paravirtualization. This form of virtualization also does not require hardware support for efficient performance.

Operating-system-level virtualization is not as flexible as other virtualization approaches (e.g., containerization) since it cannot host a guest operating system different from the host one, or a different guest kernel. Some implementations provide file-level copy-on-write (CoW) mechanisms. Most commonly, a standard file system is shared between partitions, and those partitions that change the files automatically create copies. This is easier to back up, more space-efficient, and simpler to cache than the block-level copy-on-write schemes common on whole-system virtualization. Whole-system virtualization, however, can work with non-native file systems and create and roll back snapshots of the entire system state.

SUMMARY

Embodiments of the present invention disclose a computer-implemented method, a computer program product, and a system for cognitively determining and applying image updates to one or more containers. The computer-implemented method includes one or more computer processers detecting an updated image for a container. The one or more computer processors, responsive to a pull request for the detected updated image, create a set of update information, wherein the set of update information includes one or more, bug fixes, features of the updated image, developer suggestions, and details of limitations introduced in the updated image. The one or more computer processors calculate a requirement value for the updated image. The one or more computer processors, responsive to exceeding a requirement threshold, update the container with the updated image.

DETAILED DESCRIPTION

Containers are prevalent in information technology and development operations, deployments, and systems. Containers allow for the rapid creation, modification, suspension, and deletion of one or more applications in a virtualized environment. Traditionally, containers are created from an image containing code and all required dependencies allowing an application to run quickly and reliably from one computing environment to another. Container images, hereinafter images, are lightweight, standalone, executable packages of software that include code, runtime, system tools, system libraries and settings. Images can be adjusted or customized by applying a plurality of layers on top of the image. Additionally, multiple images and containers can be grouped together to form sets of containers working in unison towards a common objective, goal, or task. Unfortunately, the increased ease and proliferation of containers allows significant risk of defective images and, subsequent, containers that may contain bugs, security vulnerabilities, and exploits. Commonly, images are created and generated mirroring programming development cycles, for example, after a pull request a continuous integration system may automatically test, package, and upload an updated image to a plurality of repositories. Commonly, automated scripts are utilized to pull new images irrespective of whether the new image is necessary, mandatory, or required allowing the introduction of defects and bugs that hinder or prevent a container from executing correctly. Furthermore, when pulling one or more new images, a user is never prompted or alerted to potential issues with the new image.

Embodiments of the present invention determine an image scope on an application and whether the image scope is required by an existing application, allowing the system to selectively pull and utilize updated images. Embodiments of the present invention allow for increased system efficiency and reduced memory consumption due to this selective pulling and utilization. Embodiments of the present invention recognize that by determining, pre-pull, an impact of an updated image to an application, system efficiency and overall uptime are increased. Embodiments of the present invention identifies and determines new features and bug fixes of a detected new image to determine whether the updated image is required. Embodiments of the present invention allow for the determination of a new image, concurrently, while a related application is running, drastically reducing any downtime related to updating the application. Implementation of embodiments of the invention may take a variety of forms, and exemplary implementation details are discussed subsequently with reference to the Figures.

The present invention will now be described in detail with reference to the Figures.

Figure 1:
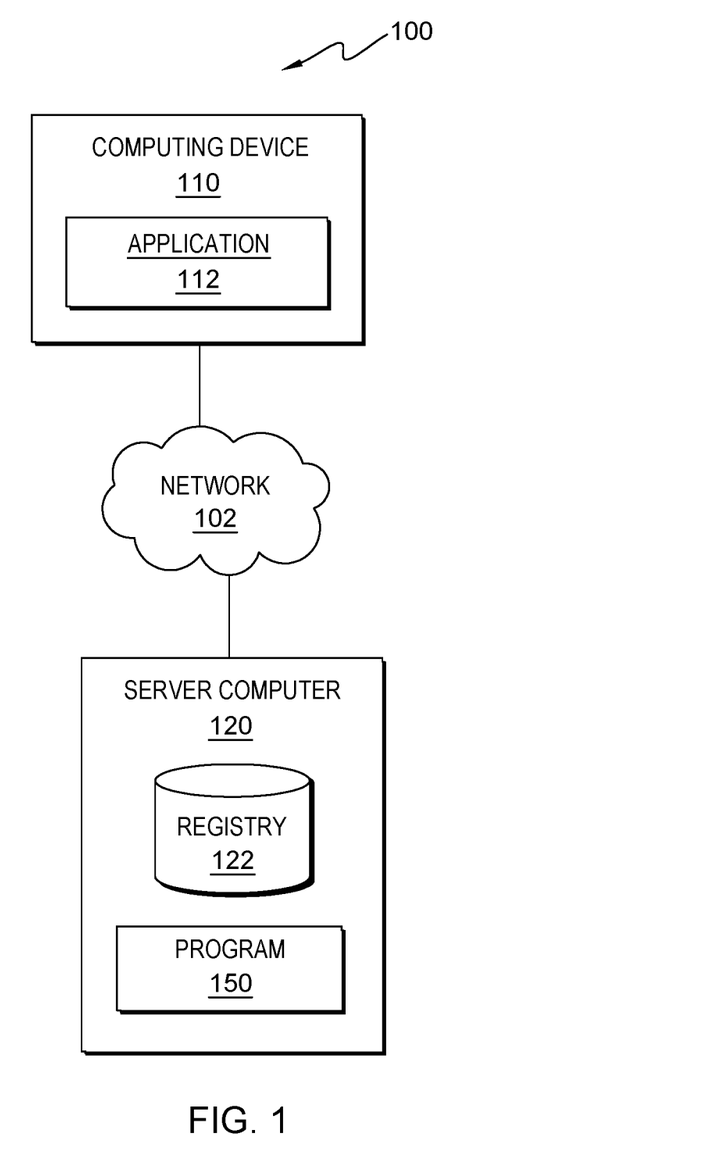
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 and server computer 120 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between computing device 110, server computer 120, and other computing devices (not shown) within distributed data processing environment 100. In various embodiments, network 102 operates locally via wired, wireless, or optical connections and can be any combination of connections and protocols (e.g., personal area network (PAN), near field communication (NFC), laser, infrared, ultrasonic, etc.).

Computing device 110 may be any electronic device or computing system capable of processing program instructions and receiving and sending data. In some embodiments, computing device 110 may be a laptop computer, a tablet computer, a netbook computer, a personal computer (PC), a desktop computer, a personal digital assistant (PDA), a smart phone, or any programmable electronic device capable of communicating with network 102. In other embodiments, computing device 110 may represent a server computing system utilizing multiple computers as a server system, such as in a cloud computing environment. In general, computing device 110 is representative of any electronic device or combination of electronic devices capable of executing machine readable program instructions as described in greater detail with regard to FIG. 3, in accordance with embodiments of the present invention. In an embodiment, computing device 110 contains application 112.

Application 112 is a set of one or more programs designed to carry out the operations for a specific application to assist a user to perform an activity (e.g., word processing programs, spread sheet programs, media players, web browsers). In the depicted embodiment, applications 112 is a set of one or more programs designed to assist in container management and orchestration. Application 112 allows a user to view all running containers, push commands into containers, add containers, remove containers, and modify containers. In an embodiment, application 112 provides a web graphical interface, allowing one or more users to access and manage the system. In another embodiment, application 112 provides an application programming interface (API) for creating, running, and modifying one or more containers. In the depicted embodiment, application 112 resides on computing device 110. In another embodiment, application 112 may reside on server computer 120 or on another device (not shown) connected over network 102.

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with computing device 110 and other computing devices (not shown) within distributed data processing environment 100 via network 102. In another embodiment, server computer 120 represents a computing system utilizing clustered computers and components (e.g., database server computers, application server computers, etc.) that act as a single pool of seamless resources when accessed within distributed data processing environment 100. In the depicted embodiment, server computer 120 includes registry 122 and program 150. In other embodiments, server computer 120 may contain other applications, databases, programs, etc. which have not been depicted in distributed data processing environment 100. Server computer 120 may include internal and external hardware components, as depicted and described in further detail with respect to FIG. 3.

Registry 122 is a registry and repository for data used by program 150. In the depicted embodiment, registry 122 resides on server computer 120. In another embodiment, registry 122 may reside on computing device 110 or elsewhere within distributed data processing environment 100 provided program 150 has access to registry 122. A database is an organized collection of data. Registry 122 can be implemented with any type of storage device capable of storing data and configuration files that can be accessed and utilized by program 150, such as a database server, a hard disk drive, or a flash memory. In an embodiment, registry 122 stores data used by program 150, such as historical images, updates, associated metadata, associated bug reports, pending pull requests, and development milestone plans.

Program 150 is a program for cognitively determining and applying image updates to one or more containers. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on computing device 110 and/or any other computing device (not depicted) within distributed data processing environment 100. Program 150 is depicted and described in further detail with respect to FIG. 2.

The present invention may contain various accessible data sources, such as registry 122, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
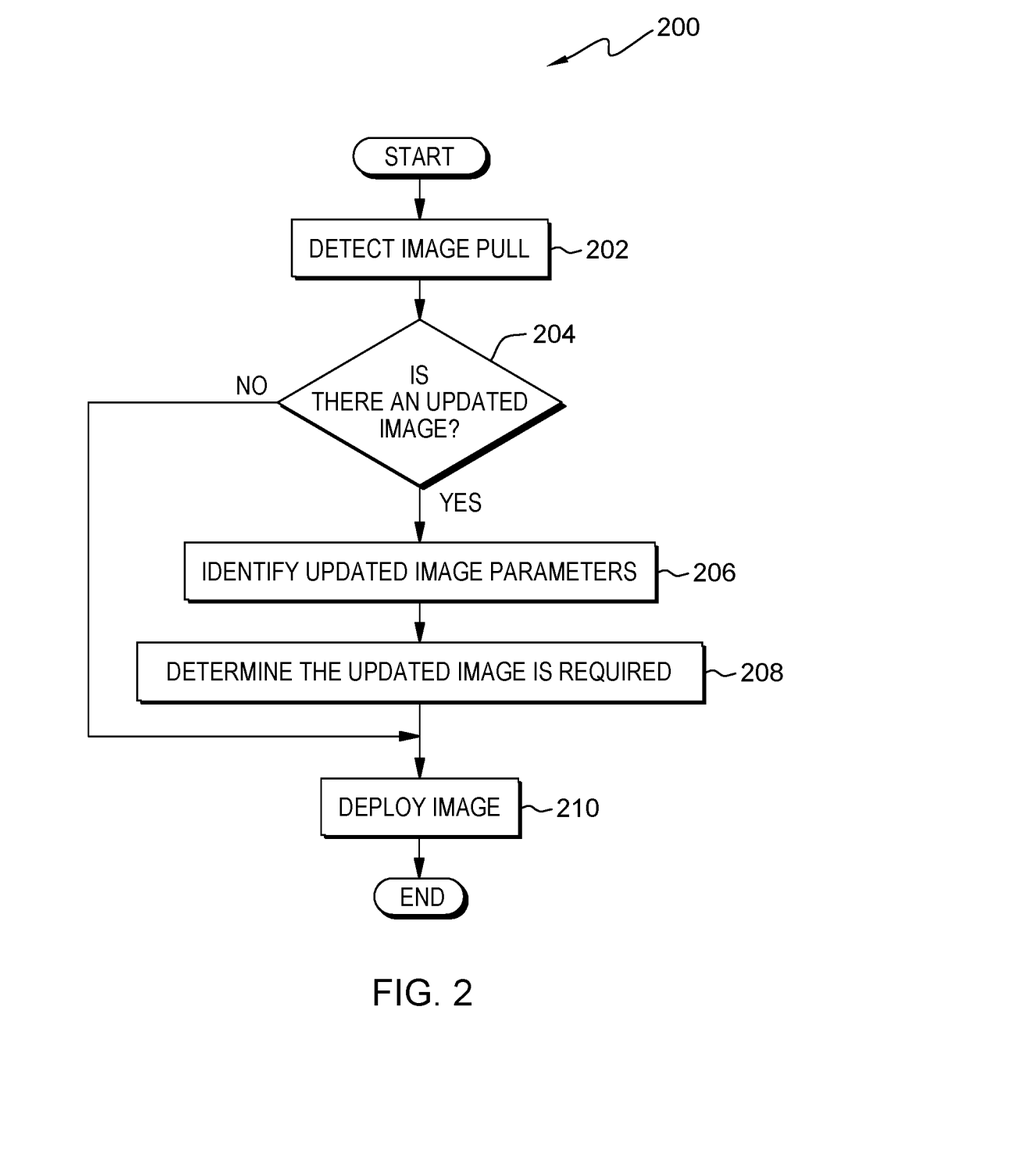
FIG. 2 is a flowchart depicting operational steps of a program, on a server computer within the data processing environment of FIG. 1, for cognitively determining and applying image updates to one or more containers, in accordance with an embodiment of the present invention.

FIG. 2 is a flowchart depicting operational steps of program 150 for cognitively determining and applying image updates to one or more containers, in accordance with an embodiment of the present invention.

Program 150 detects an image pull (step 202). Program 150 monitors registry 122 or is notified by registry 122 when an image is pushed (e.g., uploaded, packaged, etc.) or when an image stored within registry 122 is modified. In various embodiments, program 150 acts as an inline proxy and/or a transparent proxy 'sitting' in between a computing device and the destination registry (e.g., registry 122). In this embodiment, all network traffic to and from the computing device and registry 122 will travel through program 150. In another embodiment, program 150 monitors application (e.g., application 112) activity to determine a network request (e.g., image pull, request, etc.). In an embodiment, program 150 identifies an image pull and pauses, delays, or halts the pull (e.g., image storage) until program 150 can identify image parameters and determine if the image is required, as discussed below. In various embodiments, program 150 receives a notification, along with associated information and metadata, regarding a new pushed, updated, or stored image. In an embodiment, program 150 transmits a request (e.g., command, etc.) to a plurality of platform-as-a-service products and container management/orchestration applications, known in the art, to return or output a list of all updated images, in a family of images (e.g., past revisions, branches, clones, etc.).

In an embodiment, program 150 transmits a pull request (e.g., command, etc.) to a plurality of platform-as-a-service products and container management/orchestration applications, known in the art, to return or output a list of all containers and associated information such as container id, container name, status (e.g., running, paused, stopped, etc.), base image, utilized ports, container location, container health, container network, any associated labels or tags, container creation date, and related or linked containers. For example, program 150 sends a list command to a container management daemon to output a list of all available containers and program 150 may store said information in registry 122. In various embodiments, program 150 sends tags in addition to the request to constrain the output. For example, program 150 requests to only receive information regarding running containers. In this embodiment, program 150 monitors an image registry (e.g., registry 122) for any updated images related to the plurality of a containers running on a system. In an embodiment, program 150 identifies one or more features associated with a current container.

If program 150 determines that there is an updated image (decision step 204, yes branch), then program 150 identifies updated image parameters (step 206). Program 150 identifies updated image parameters. In an embodiment, program 150 scans (e.g., depth-first scanning, etc.) an image filesystem, identifying all subcomponents (e.g., dependencies, subprograms, and sub-containers) subfiles and subfolders contained within a container. In this embodiment, program 150 identifies said subcomponents by creating one or more sets of filesystem information such as filenames, folder names, parent folders, subfolders, associated permissions, creation dates, modified dates, and associated metadata. In another embodiment, program 150 scans through each folder contained in or associated with an image. In this embodiment, program 150 begins at the root folder (e.g., "/") and recursively follows each subfolder down to the its "leaves" or instances where no subfolders or files exist. In various embodiments, program 150 creates a set of update information that includes changelogs, bug fixes, new introduced features, developer suggestions, and details of any existing limitations.

Program 150 records all the instances, including associated information and metadata, developing a map of the file structure of the container. Responsive to program 150 completing a scanning operation, program 150 may compare the recorded image information with the container currently in use. Here, program 150 maintains a list of image differences including all changed files and associated metadata. In an embodiment, program 150 utilizes the list of identified software to identify and retrieve patch and changelog information describing one or more changes in the updated image and/or an overall purpose for the updated image. For example, program 150 identifies an updated image and from an associated changelog, program 150, utilizing natural language processing techniques, parses the changelog and identifies that the update is an image rebase.

If program 150 determines that there is not an updated image (decision step 204, no branch), then program 150 deploys an image (step 210), as described below. In an embodiment, program 150 reinstates or unsuspends a previously running container. In another embodiment, program 150 redeploys the original application or container.

Program 150 determines that the updated image is required (step 208). Program 150 determines the scope (e.g., intention) of an update and reconciles said scope with the purpose of the container. Program 150 utilizes the update parameters, identified in step 206, contained within a set of update information to determine whether an updated image is required. In an embodiment, the term "require(s)" (e.g., mandatory, compulsory, recommended, etc.) represents a change (e.g., update, patch, version, etc.) containing a fix for one or more features utilized by a current container, image, or application. Program 150 identifies a purpose and/or one or more features associated with a current container. In this embodiment, program 150 receives, retrieves, or identifies one or more functions associated with a container and/or associated image. For example, an example container is utilized to host a web server and an associated database. Here, program 150 determines that the purpose of the container is to publicly serve one or more webpages. Additionally, program 150 determines one or more features associated with the purpose, for example ability to be accessed externally, ability to serve webpages, ability to securely access the database, and additional security considerations (e.g., file permissions, database permissions, etc.). In a further embodiment, program 150 weighs each determined feature of the current container to determine the most critical features associated with a determined container purpose. For example, an ability to publicly present web content is a highly weighted feature of a web server container.

Program 150, then, compares the determined features of a current container with a created set of update information in order to calculate a requirement value representing a degree of benefit or enchantment that an update would confer a current container. In various embodiments, a requirement value is a numerical score or probability. In an embodiment, program 150 utilizes the aggregation of all the weighed features to calculates a requirement value. In another embodiment, program 150 maintains a predetermined requirement threshold. In this embodiment, if a requirement value exceeds the requirement threshold, then program 150 determines that the update image is required and mandatory. In an embodiment, program 150 automatically updates and deploys an updated image if the update exceeds a requirement threshold. Alternatively, if the requirement value does not exceed the requirement threshold, then program 150 does not alter a current container or program 150 presents the update as a suggestion to a user.

Program 150, then, presents, displays, or prompts a user with one or more update suggestions. In an embodiment, the update suggestion contains information regarding the suggested container update, the effect the update will have on other linked containers, details regarding expected container/host performance, and possible ramifications such as security considerations and potential broken file dependencies. In an embodiment, program 150 notifies or prompts the user for a response (e.g., update selection). In other embodiments, program 150 presents a maintained list of all update suggestions along with associated information. In these embodiments, program 150 presents the list of updates to one or more users through a graphical user interface (not depicted). Said graphical user interface may exist on a utilized computing device (not depicted), allowing the user to modify the layers due to errors, corrections, or changes in the image. In another embodiment, program 150 presents the list through the command line, stdout, or terminal view of the host system. In various embodiments, program 150 may generate, adjust, modify, and/or transform the appearance of a plurality (e.g., group consisting of) of stylistic elements of presented updates. In an embodiment, said plurality may include; adjustments to font, font size, character style (e.g., bold, italics, font color, background color, superscript, subscript, capitalization, etc.), general transparency, relative transparency, etc. For example, program 150 applies a "bold" adjustment to a mandatory update. Program 150 may pause or suspend until a user response or update selection is received. In an embodiment, program 150 maintains a timeout function or threshold that controls how long program 150 waits, suspends, or pauses for the user response. In this embodiment, if the user does not respond within a specified duration, then program 150 automatically selects (e.g., determines, ranks, and selects, etc.) an update.

Program 150 deploys image (step 210). Responsive to program 150 determining that the updated is required or mandatory, then program 150 pulls, receives, or stores the updated image, detailed in the above steps, from registry 122 or one or more image repositories, into one or more production environments or containers. In an embodiment, program 150, automatically, deploys the updated image and associated container to another host or cluster of hosts. In an embodiment, program 150 patches the layer (e.g., images) with respective vulnerability patches or fixes based on the identified vulnerabilities. In this embodiment, program 150 adjusts the file structure of a container based on the modifications (e.g., patches, hardening, etc.). In various embodiments, program 150 automatically hardens a container after the software has been identified and reported. In this embodiment, program 150 retrieves and utilizes best practices associated with the software or the type of software. For example, if program 150 identifies a webserver on a container, then program 150 may implement practices on the container that restrict the public viewing of the root folder of the webserver. In various embodiments, hardening a container includes, but is not limited to, downgrading to a non-privileged user, limiting resource usage, sandboxing critical processes, limiting volume mounts, and binding privileged ports. In another embodiment, program 150 automatically pushes the modified container or container image (e.g., modified image based on the VFS) to an image registry. In another embodiment, program 150 automatically deploys the modified container to another host or cluster of hosts.

Figure 3:
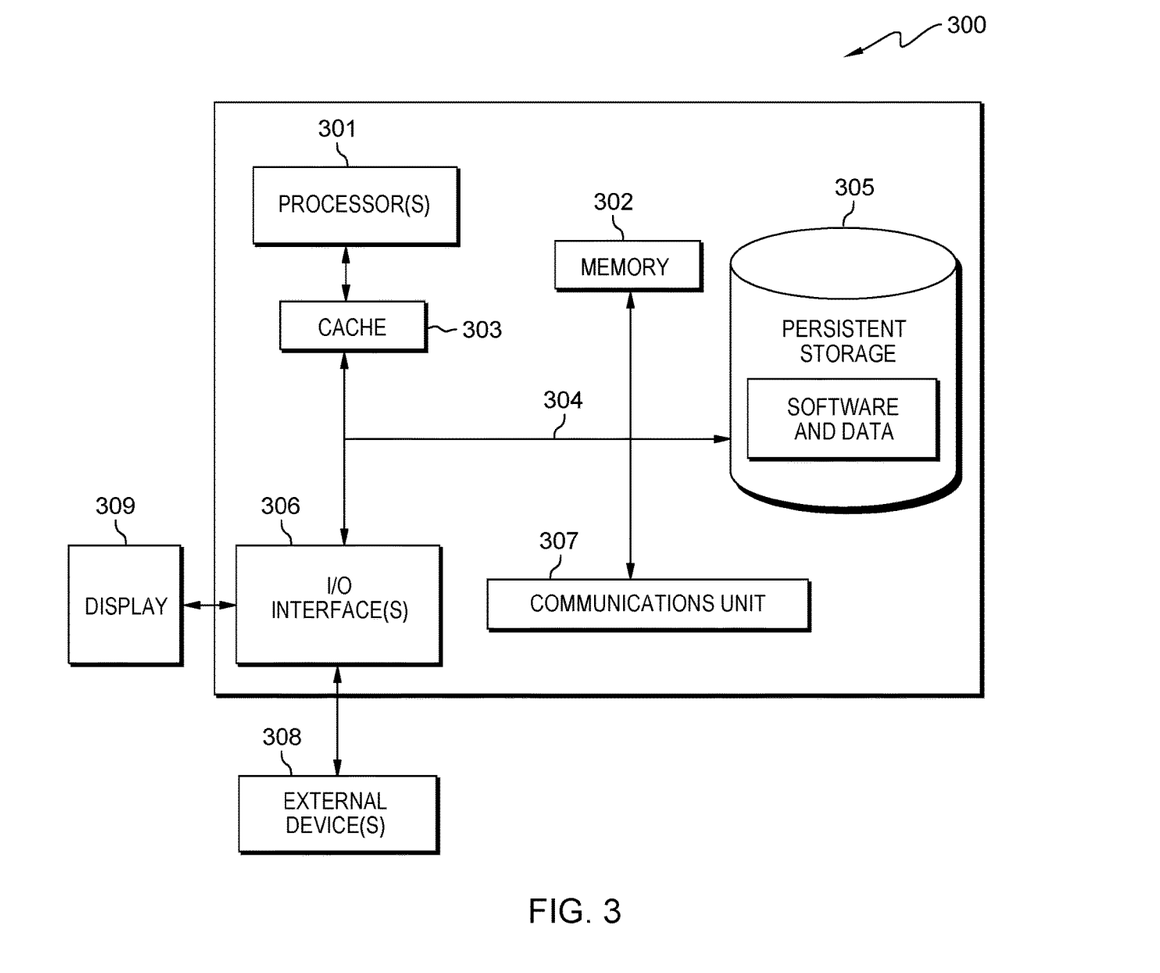
FIG. 3 is a block diagram of components of computing device and server computer, in accordance with an embodiment of the present invention.

FIG. 3 depicts a block diagram of components of computing device 110 and server computer 120 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 and server computer 120 includes communications fabric 304, which provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications, and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of computer processor(s) 301 by holding recently accessed data, and data near accessed data, from memory 302.

Program 150 may be stored in persistent storage 305 and in memory 302 for execution by one or more of the respective computer processor(s) 301 via cache 303. In an embodiment, persistent storage 305 includes a magnetic hard disk drive. Alternatively, or in addition to a magnetic hard disk drive, persistent storage 305 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program 150 may be downloaded to persistent storage 305 through communications unit 307.

I/O interface(s) 306 allows for input and output of data with other devices that may be connected, respectively, to computing device 110 and server computer 120. For example, I/O interface(s) 306 may provide a connection to external device(s) 308, such as a keyboard, a keypad, a touch screen, and/or some other suitable input device. External devices 308 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 305 via I/O interface(s) 306. I/O interface(s) 306 also connect to a display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q #, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   monitoring, by one or more computer processors, a container for network traffic associated an image pull;
   suspending, by one or more computer processors, the image pull for an updated image for the container;
   identifying, by one or more computer processors, one or more subcomponents associated with the updated image by recursively scanning a filesystem of the updated image, wherein the subcomponents are dependencies, subprograms, sub-containers, subfiles, and subfolders;
   creating, by one or more computer processors, a set of features of the updated image associated with a purpose associated with the container;
   calculating, by one or more computer processors, a requirement value for the updated image based on the created set of features, wherein the requirement value is an aggregation of weighed features;
   responsive to the calculated requirement value failing to exceed a requirement threshold, presenting, by one or more computer processors, one or more update suggestions based on the calculated requirement value to a user;
   responsive to a user selecting an update suggestion of the one or more presented update suggestions, updating, by one or more computer processors, the container with the updated image; and
   hardening, by one or computer processors, the updated container, wherein hardening includes downgrading to a non-privileged user, limiting resource usage, sandboxing critical processes, limiting volume mounts, and binding privileged ports.

2. The method of claim 1, further comprising:
   deploying, by one or more computer processors, the updated container.

3. The method of claim 1, wherein calculating the requirement value for the updated image, further comprises:
   identifying, by one or more computer processors, one or more features associated with the container;
   comparing, by one or more computer processors, each of the one or more identified features with the created set of update information; and
   calculating, by one or more computer processors, the requirement value based on the compared features.

4. The method of claim 3, further comprising:
   determining, by one or more computer processors, whether the updated image is required based on the calculated requirement value.

5. The method of claim 3, further comprising:
   identifying, by one or more computer processors, a purpose of the container; and
   determining, by one or more computer processors, one or more features associated with the identified purpose.

6. The method of claim 1, wherein the update suggestion contains a suggested container update, linked containers considerations, expected container performance, and security considerations.

7. The method of claim 6, further comprising:
   adjusting, by one or more computer processors, a font, a font size, a character style, and a transparency associated with the presented update suggestion.

8. A computer program product comprising:
   one or more computer readable storage media and program instructions stored on the one or more computer readable storage media, the stored program instructions comprising:
   program instructions to monitor a container for network traffic associated an image pull;
   program instructions to suspend the image pull for an updated image for the container;
   program instructions to identify one or more subcomponents associated with the updated image by recursively scanning a filesystem of the updated image, wherein the subcomponents are dependencies, subprograms, sub-containers, subfiles, and subfolders;
   program instructions to create a set of update features of the updated image associated with a purpose associated with the container;
   program instructions to calculate a requirement value for the updated image based on the created set of features, wherein the requirement value is an aggregation of weighed features;
   program instructions to, responsive to the calculated requirement value failing to exceed a requirement threshold, present one or more update suggestions based on the calculated requirement value to a user;

program instructions to, responsive to a user selecting an update suggestion of the one or more presented update suggestions, update the container with the updated image; and program instructions to harden the updated container, wherein hardening includes downgrading to a non-privileged user, limiting resource usage, sandboxing critical processes, limiting volume mounts, and binding privileged ports.

9. The computer program product of claim 8, wherein the program instructions, stored on the one or more computer readable storage media, comprise:

program instructions to deploy the updated container.

10. The computer program product of claim 8, wherein the program instructions, to calculate the requirement value for the updated image, comprise:

program instructions to identify one or more features associated with the container;

program instructions to compare each of the one or more identified features with the created set of update information; and program instructions to calculate the requirement value based on the compared features.

11. The computer program product of claim 8, wherein the program instructions, stored on the one or more computer readable storage media, comprise:

program instructions to determine whether the updated image is required based on the calculated requirement value.

12. The computer program product of claim 8, wherein the update suggestion contains a suggested container update, linked containers considerations, expected container performance, and security considerations.

13. The computer program product of claim 8, wherein the program instructions, stored on the one or more computer readable storage media, comprise:

program instructions to adjust a font, a font size, a character style, and a transparency associated with the presented update suggestion.

14. A computer system comprising:

one or more computer processors;

one or more computer readable storage media; and program instructions stored on the computer readable storage media for execution by at least one of the one or more processors, the stored program instructions comprising:

program instructions to monitor a container for network traffic associated an image pull;

program instructions to suspend the image pull for an updated image for the container;

program instructions to identify one or more subcomponents associated with the updated image by recursively scanning a filesystem of the updated image, wherein the subcomponents are dependencies, subprograms, sub-containers, subfiles, and subfolders;

program instructions to, create a set of update features of the updated image associated with a purpose associated with the container;

program instructions to calculate a requirement value for the updated image based on the created set of features, wherein the requirement value is an aggregation of weighed features;

program instructions to, responsive to the calculated requirement value failing to exceed a requirement threshold, present one or more update suggestions based on the calculated requirement value to a user;

program instructions to, responsive to a user selecting an update suggestion of the one or more presented update suggestions, update the container with the updated image; and program instructions to harden the updated container, wherein hardening includes downgrading to a non-privileged user, limiting resource usage, sandboxing critical processes, limiting volume mounts, and binding privileged ports.

15. The computer system of claim 14, wherein the program instructions stored, on the one or more computer readable storage media, comprise:

program instructions to deploy the updated container.

16. The computer system of claim 14, wherein the program instructions, to calculate the requirement value for the updated image, comprise:

program instructions to identify one or more features associated with the container;

program instructions to compare each of the one or more identified features with the created set of update information; and program instructions to calculate the requirement value based on the compared features.

17. The computer system of claim 14, wherein the program instructions stored, on the one or more computer readable storage media, comprise:

program instructions to determine whether the updated image is required based on the calculated requirement value.

18. The computer system of claim 14, wherein the update suggestion contains a suggested container update, linked containers considerations, expected container performance, and security considerations.

* * * * *